United States Patent [19]

Kaufman

[11] 3,731,172
[45] May 1, 1973

[54] BIPOLAR SERVO AMPLIFIER COMMUTATION CIRCUIT USING A SEPARATE SILICON CONTROLLED RECTIFIER AND ISOLATED POWER SUPPLY FOR CHARGING A COMMUTATION CAPACITOR

[75] Inventor: Raymond H. Kaufman, El Paso, Tex.

[73] Assignee: The United States of America as represented by the Secretary of the Army

[22] Filed: Mar. 24, 1972

[21] Appl. No.: 237,667

[52] U.S. Cl. .................................. 318/439, 318/254
[51] Int. Cl. .............................................. H02k 29/00
[58] Field of Search ............... 318/439, 254, 138, 318/611

[56] References Cited

UNITED STATES PATENTS

| 3,619,746 | 11/1971 | Thornton et al. | 318/439 |
| 3,631,529 | 12/1971 | Ohyama | 318/439 X |
| 3,662,237 | 5/1972 | Favre | 318/254 |

*Primary Examiner*—Benjamin Dobeck
*Attorney*—Harry M. Saragovitz et al.

[57] ABSTRACT

A direct current powered commutation and damping system for a servo motor having both forward and reverse direction commutation circuits that use silicon controlled rectifiers for control. A logic circuit with a plurality of sequentially timed outputs is used for controlling the period of the duty and the damping cycles. The damping cycle is on for about 5 percent of the entire system repetition period, and is specifically on during the off period of the motor power pulse.

3 Claims, 5 Drawing Figures

PATENTED MAY 1 1973  3,731,172

BIPOLAR SERVO AMPLIFIER COMMUTATION CIRCUIT USING A SEPARATE SILICON CONTROLLED RECTIFIER AND ISOLATED POWER SUPPLY FOR CHARGING A COMMUTATION CAPACITOR

The invention described herein may be manufactured, used, and licensed by or for The Government for governmental purposes without the payment to me of any royalty thereon.

BACKGROUND OF THE INVENTION

Alternating current circuits are inherently self-commutating and would always be used if they were no severely bandwidth limited by the frequencies of commercially available power supplies. The 60 cycle full wave driver furnishes power in bursts of one hundred and twenty times per second. Even by using a three phase, sixty cycle, full wave signal the frequency is only three hundred and 60 power pulses per second. Even this pulse rate may give marginal performance for truly high response servo systems. Self-commutation systems using higher pulse rate, such as one kilohertz and above, are more desirable.

Damping is required whenever the motor energy exceeds that furnished by the driver. Good damping is inherent in motor-generator driven servo systems since the servo motor is always shunted by the generator output windings. However, solid state drivers lack this capability. The only known means for commutation of solid state drivers are motor shunt resistance circuits. These shunt resistance circuits are usually very inefficient since there must be a compromise in the value of the resistance. For the resistance to be effective it must be small, but for the resistance to be efficient it must be large. Some of these resistance commutation systems require as much commutation power as servo amplifier load power. Commutation with silicon controlled rectifiers and isolated power supplies, rather than the use of resistors, is much more desirable because there is very little power used in each silicon controlled rectifier when it is momentarily switched off.

SUMMARY OF THE INVENTION

The present invention includes clockwise and counterclockwise silicon controlled rectifier (SCR) commutation circuits that provide servo motor damping with the servo operating either in the clockwise or counterclockwise direction, respectively. Each commutation circuit is switched at controlled periods of time by various outputs from a logic control circuit being applied to the gates of various SCRs. Both clockwise and counterclockwise commutation circuits comprise a commutation capacitor connected in series with an isolated power supply and a charging SCR. One side of the commutation capacitor is connected to the anode of its respective motor SCR with the other side of the commutation capacitor connected to a junction of the anode of the commutation SCR and the cathode of the charging SCR. A bridge network of four motor SCRs is connected across the motor with their anodes and cathodes serially connected. A direct current (d.c.) potential source is connected across the serially connected bridge network in the forward conduction direction.

The logic control circuit of this invention has a 1 kilohertz pulse width modulated (PWM) output signal for controlling the power duty and damping cycles of the servo motor. Assume that the clockwise commutation capacitor is already charged and the servo is operating in the clockwise direction, a first output from the logic control circuit gates "on" the clockwise motor SCRs. At 500 microseconds after the first output, a second output from the logic control circuit gates "on" the clockwise commutation SCR that, in turn, provides a discharge path for the clockwise commutation capacitor. Discharge of this commutation capacitor lowers the voltage instantaneously at the anode of the adjoining clockwise motor SCR, thus commutating off that motor SCR with the result that the current path through the motor is open circuited. The clockwise commutation SCR is automatically commutated off when the clockwise commutation capacitor is completely discharged since the voltage across the clockwise commutation SCR is zero. At the beginning of the last 500 microseconds of the 1,000 microsecond PWM signal, the clockwise charging SCR is gated "on" and the isolated power supply is connected across the clockwise commutation capacitor. When the clockwise commutation capacitor is charged the charging SCR is commutated off since there is no longer a voltage differential across the charging SCR. One cycle is complete and the clockwise commutation capacitor is in condition for the next cycle of operation. The logic control circuit switches on the counterclockwise discharge path, or damping path, when the servo is operating in the clockwise direction. This damping path is on for typically 5 percent of the duty cycle, and at the time when the clockwise motor SCRs are commutated off.

DESCRIPTION OF THE PREFERRED EMBODIMENT

Figure 1:
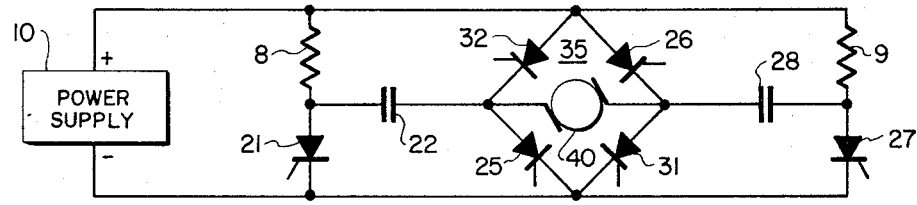
FIG. 1 is a schematic diagram of a prior art resistance-capacitance bipolar servo amplifier driver commutator.

Refer to FIG. 1 for an explanation of a prior art bipolar commutation circuit using resistance and capacitance. These prior art commutation circuits are inefficient, usually requiring as much commutation power as servo amplifier power. In the clockwise commutation circuit, commutation resistor 8 in series with commutation SCR 21 provides a direct current charge and discharge path for commutation capacitor 22. The same is true of resistor 9 and commutation SCR 27 for commutation capacitor 28 for commutation in the counterclockwise circuit.

There are many disadvantages to this circuit that need correcting. Using the clockwise commutation circuit that includes resistor 8, SCR 21, and capacitor 22 as an explanation, these disadvantages can readily be seen. First, when commutation SCR 21 is gated "on" it is subject to staying on past the control time since positive voltage from power supply 10 tends to keep commutation resistor 8 slightly positive on the side in common with the anode of commutation SCR 32. That is, the rapid discharge of commutation capacitor 22 through gated "on" commutation SCR 21 may not have the necessary momentum to commutate SCR 21 "off" by this $dv/dt$ effect at the anode of commutation SCR 21. Commutation SCR 21 must, therefore, be commutated "off" by the drop in voltage from the anode of motor SCR 25 across commutation capacitor 22. During the time that commutation SCR 21 is "on" there is a high power loss due to current flowing through charging resistor 8. This power loss can become quiet excessive during the "on" period for SCR 21. The power dissipated in resistor 8 varies inversely with the commutation cycle. For example, if the commutation cycle is 5 percent of a 1 kilocycle signal the power dissipated is typically equal to the following, 120 amps × 120 volts × 0.05 = 720 watts. If the commutation cycle is 95 percent of the signal, the power dissipated in resistor 8 is equal to the following, 120 amps × $a$20 volts × 0.95 = 13,680 watts. Even with the commutation cycle being 50 percent of the signal, power dis-sipation is equal to, 120 amps × 120 volts × 0.50 = 7,200 watts. The bipolar servo amplifier driver commutation circuit of the present invention uses much less power, on the order of 125 watts per commutation circuit.

Figure 2:
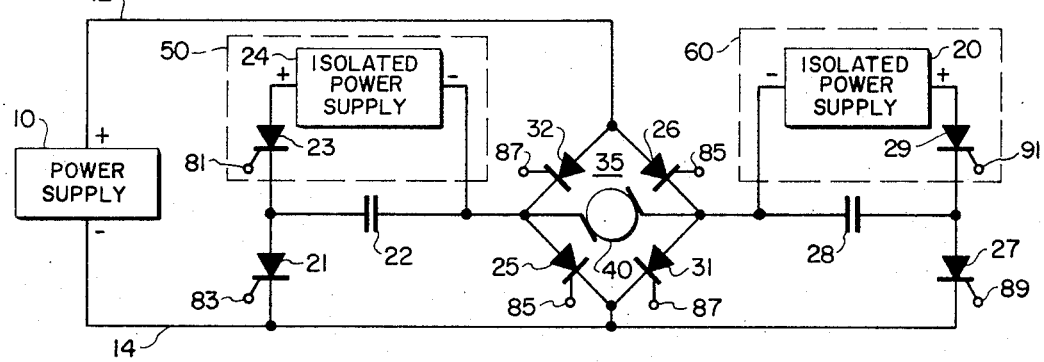
FIG. 2 is a schematic diagram of the inventive bipolar servo amplifier driver commutation circuit.

Refer to FIG. 2 for an explanation of the operation of the bipolar servo amplifier driver commutation circuit of the present invention. A main direct current potential source 10 is connected across bridge network 35 with the positive source of 10 being on lead 12 and the negative source of 10 being on lead 14. Bridge network 35, across motor 40, comprises motor SCRs 25, 26, 31, and 32. Clockwise motor SCRs 25 and 26 are intermittently gated "on" and commutated "off" during the power duty cycle by output signals from a logic control circuit when the motor is operating in the clockwise direction, and, likewise, counterclockwise motor SCRs 31 and 32 are gated "on" and commutated "off" by the logic control circuit when the motor is operating in the counterclockwise direction. Also, each of these opposite pairs of SCRs are gated on for about 5 percent of the duty cycle after the main power pulse is passing through the motor in the other direction. This provides a 50 microsecond pulse for damping.

Block 50, of FIG. 2, represents the clockwise commutation circuit of the present invention that is used for commutating SCRs 25 and 26. Likewise, block 60 represents the counterclockwise commutation circuit for commutating SCRs 31 and 32. Both commutation circuits 50 and 60 operate in an identical manner. One cycle of operation of clockwise commutation circuit 50 is explained hereinbelow.

An isolated power supply 24, of about 100 direct current volts and with polarity as shown in FIG. 2, is connected in series with clockwise charging SCR 23 and clockwise commutation capacitor 22. Clockwise commutation SCR 21 operates with the clockwise commutation circuit 50 and has its anode connected to a junction between the cathode of charging SCR 23 and one side of commutation capacitor 22. A logic control circuit (explained hereinbelow in reference to FIGS. 2-5) switches motor SCRs 25 and 26, charging SCR 23, and commutation SCR 21 "on" in a predetermined time frame according to the frequency desired. A signal frequency of 1 kilohertz is assumed. However, higher switching frequencies may be used with the commutation circuits of the present invention. The control circuit gates SCRs 25 and 26 "on" such that potential source 10 furnishes power through the winding of motor 40 by way of lead 12, SCR 26, motor 40, SCR 25, and lead 14. Commutation capacitor 22 is assumed to be charged prior to gating SCRs 25 and 26 "on." In 500 microseconds after SCR 25 and 26 are gated "on" commutation SCR 21 is gated "on" by another output from the logic control circuit. When SCR 21 is gated "on," the charge on commutation capacitor 22 begins to discharge through SCR 21. This discharge instantaneously lowers the voltage on the anode of SCR 25 and thus commutates SCR 25 "off." With SCR 25 "off," power flow through motor 40 and SCR 26 ceases. The complete discharge of commutation capacitor 22 automatically commutates SCR 21 "off" since voltage across SCR 21 is equalized. After a delay of 500 microseconds from the time that SCR 21 is gated "off," a third output from the logic control circuit triggers SCR 23 "on" for recharging commutation capacitor 22. Capacitor 22 is recharged by SCR 23 connecting isolated power supply 24 directly thereacross. Features of these SCRs are that they turn-off in about 20 microseconds. Turn-off time for the SCRs is not critical since approximately 500 microseconds is available for each capacitor charge and discharge periods. The value of commutation capacitor 22 required for use at any frequency is determined according to (1) the voltage of power supply 24, (2) the turn-off time of SCR 25, and (3) the anode current at turn-off time of SCR 25.

Figure 3:
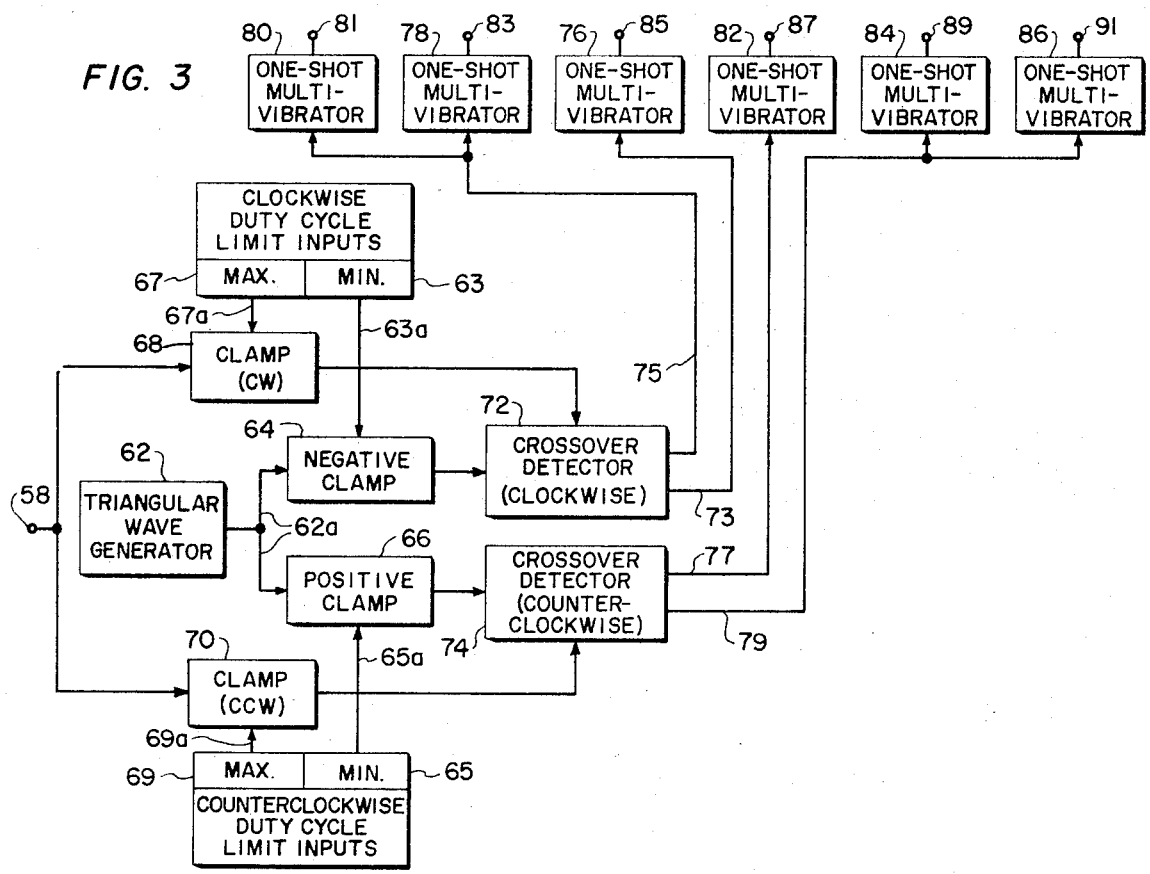
FIG. 3 is a block diagram of the logic control circuit used in gating the SCRs of the commutation circuits.
Figure 4:
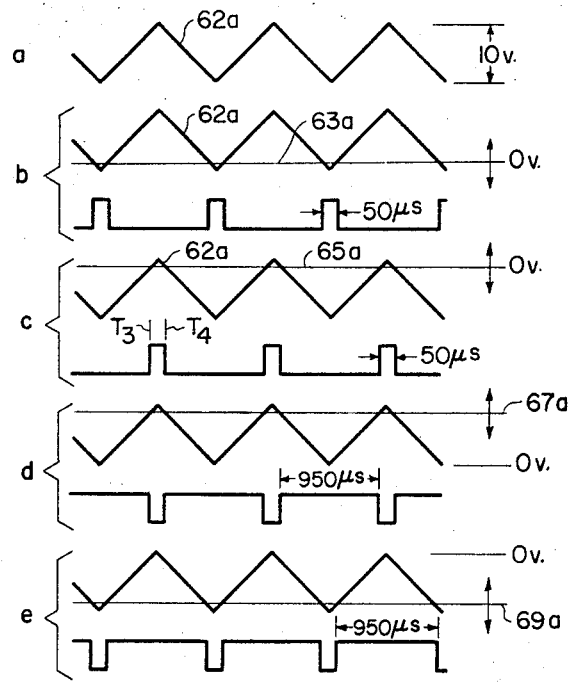
FIG. 4 illustrates typical waveforms of the control circuit.

A more detailed cycle of operation is hereby explained with reference to FIGS. 2-5. FIG. 3 illustrates the block diagram of the logic control circuit used for controlling the gating periods of the various SCRs. The logic control circuit consists basically of outputs that assure that commutation SCR 21 and charging SCR 23 are gated "on" at equally spaced increments of time for respectively discharging and recharging commutation capacitor 22. More specifically, the logic control circuit consists of a linear triangular wave shape generator 62 whose output is ± 10 volts peak-to-peak triangular wave 62$a$ (FIG. 4$a$) that is fed into clamping circuits 64 and 66. The negative and positive peaks of wave 62$a$ are clamped, respectively, by voltages from blocks 63 and 65. FIG. 4 illustrates clamping of this waveform in which waveform 4$b$ represents clamping in the clockwise direction, and waveform 4$c$ represents clamping in the counterclockwise direction. Waveform 4$d$ represents maximum duty cycle clamping in the clockwise direction, and waveform 4$e$ represents maximum duty cycle clamping in the counterclockwise direction. An input signal E sig that has a d.c. voltage ranging from ± 9.5 volts is applied to terminal 58. A value of zero volts for E sig is assumed. E sig is applied to blocks 68 and 70. Blocks 68 and 70 represent, respectively, clockwise and counterclockwise maximum duty cycle limits by limiting the E sig voltage to a desired value. The output clamped signals from 68 and 70, are applied, respectively, to detectors 72 and 74. The operation of detectors 72 and 74 are identical, therefore, only the operation of clockwise cross-over detector 72 will be explained. Detector 72 is a cross-over detector comparator circuit in which the polarity of the negative clamped triangular wave from block 64 and the constant voltage output signal from 68 are compared. Assuming a half power command, the output of detector 72 will be a square wave of alternate positive and negative peaks of equal duration. There are two outputs from detector 72 represented by leads 73 and 75 on FIG. 3, and shown as waveform 73 and 75 respectively on FIG. 5(a) and 5(b).

Figure 5:
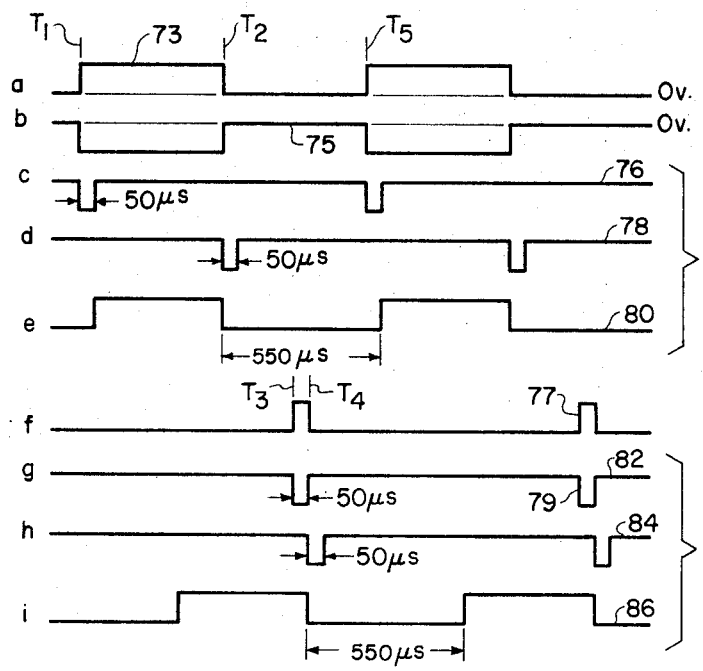
FIG. 5 illustrates operational sequence waveforms corresponding to the commutation and power duty cycles.

FIG. 5 illustrates typical waveforms, present in the logic circuit of FIG. 3 for use in triggering the various SCRs in the commutation circuit of the present invention. For the purpose of explaining the components and their function in this invention the servo is assumed operating in the clockwise direction at half power drive with a power duty cycle of 50 percent and damping duty cycle of five percent. Waveforms 73 and 75 are of 1,000 microseconds duration with the time from T1 to T2 being 500 microseconds and the time from T3 to T5 being 500 microseconds. That is, a triangular wave of ± 9.5 volts peak-to-peak from 62 is applied at one input to detector 72 at a repetition rate of 1 kilohertz and the clamped signal from 68 is a constant d.c. voltage of zero potential. Waveform 73 is applied directly to the input of one shot multivibrator 76. Waveform 75 is applied to one shot multivibrators 78 and 80. The positive transition of waveform 73, at time T1, triggers on multivibrator 76. In FIG. 5c, the output of multivibrator 76 is a one shot 50 microsecond negative pulse. The output of 76 returns sharply to a positive value after the 50 microseconds pulse and is stable for the remaining 950 microseconds of the system cycle. The positive transition is applied to gate electrodes 85 of clockwise motor SCRs 25 and 26 and gates these SCRs "on," beginning the power cycle. In FIG. 5d the output of one shot multivibrator 78 is a 50 microsecond negative pulse. At the end of the 50 microsecond pulse, the positive return of the signal gates "on" commutation SCR 21 by application of this positive pulse to gate electrode 83, thus starting discharge of commutation capacitor 22. The output pulse of one shot multivibrator 80, shown in FIG. 5e, remains negative for 550 microseconds due to a large interval time delay circuit therein. The function of the output from multivibrator 80 will be explained later. With commutation SCR 21 "on" commutation capacitor will completely discharge and thus motor SCR 25 will be commutated "off" due to the positive voltage being instantaneously removed from its anode and, likewise, after capacitor 22 discharge, SCR 21 will also be commutated "off." With clockwise motor SCR 25 "off," clockwise motor SCR 26 is also automatically turned "off" since SCR 25 presents an open circuit. When the 550 microsecond negative output pulse at the output of multivibrator 80 ends the sharp positive transition is applied at gate electrode 81 of charging SCR 23, thus turning SCR 23 "on." With charging SCR 23 " on," isolated power supply 24, of 100 volts d.c., is applied across commutation capacitor 22 for recharging before the next power cycle beginning at time T5 shown in FIG. 5a. After capacitor 22 is recharged, charging SCR 23 is automatically commutated "off" since there is no voltage differential between its cathode and anode. The time needed for capacitor 22 to charge is limited mostly peak current rating of charging SCR 23, but is also limited by some inherent circuit resistance and stray inductance. By using charging SCR's with high current ratings and minimizing stray inductance, charge times of less than 50 microseconds are readily achieved.

The time duration between the positive return of the output of multivibrator 76 and the positive return of the output of multivibrator 78 is 500 microseconds, or half of the duty cycle. This is the power cycle in the clockwise direction. During the remaining 500 microseconds of the duty cycle the clockwise SCRs 25 and 26 remain commutated "off." It is during these last 500 microseconds that clockwise motor SCRs 25 and 26 are commutated "off" that the 5 percent damping cycle is activated and for 50 microseconds power supply 10 is connected across the counterclockwise windings in motor 40. FIG. 5f shows initiation of the damping cycle wherein an output 77 from counterclockwise detector 74, during the period T3 to T4, is applied to one-shot multivibrator 82. The output of multivibrator 82 goes negative but returns positive after a 50 microsecond internal delay. Counterclockwise motor SCRs 31 and 32 are gated on when the output of 82 returns positive and this positive voltage is applied to gate electrodes 87 of SCRs 31 and 32. The output of 82 is an inverted output of waveform 77 at the output of detector 74, and in FIG. 5g also represents waveform 79 from detector 74. The positive return of waveform 79, at time T4, triggers one shot multivibrator 84. After a 50 microsecond delay in 84, its output returns positive. This positive output is applied to gate electrode 89 of counterclockwise commutation SCR 27. Counterclockwise commutation capacitor 28 is instantaneously discharged, thus commutating counterclockwise motor SCRs 31 and 32 and ending the damping cycle. FIGS. 4(c) and 4(d) represent, respectively, the counterclockwise damping duty cycle time and the clockwise duty cycle time. Also during this time, commutation capacitor 22 is discharged and then recharged for repeating the power cycle. The capacitance required for charging capacitor 22 is determined by the following formula, $$C_c = [t_o(IA)]/V_c, \qquad (1)$$

where, $C_c$ = commutation capacitor
$t_o$ = SCR turn-off time
$IA$ = anode current at turn-off
$V_c$ = $C_c$ charge voltage Assume that the frequency of the duty cycle is 1 kilohertz, and the SCR turn-off time is 25 microseconds (a typical value), anode current at turn-off is 100 amperes and the $C_c$ charge voltage is 100 volts. By use of Equation (1), the value of the commutation capacitor required for these values is 25 microfarads.

Commutation circuits 50 and 60 of the present invention are much more efficient than prior circuits using resistors in shunt with the motor. By using a serially connected charging SCR and an isolated power supply, the circuit requires only the energy per commutation capacitor charge multiplied by the number of charges per second. The power in watts per capacitor is equal to $CE^2$. Therefore, the power per second is
½ $CE^2$ × 100 cy sec = ½ × 25 × $10^{-6}$ × $100^2$ × 1000 = 125 watts per commutation circuit The total bipolar commutation power requirements are, therefore, constant at 250 watts regardless of the duty cycle. Prior art commutators using resistors dissipated energy according to the duty cycle. At 5 percent commutation duty cycle the power used in a bipolar commutation system was about 720 watts. At 95 percent commutation duty cycle the power used was about 13,680 watts. It can clearly be seen that efficiency of the commutation circuits using a power cupply and a charging SCR instead of the prior art resistors is much improved. The present commutation circuit can be used in any direct current servo system, whether unidirectional or bidirection, whether low power, high power or very high power. It can also be used for machine tool servo systems, instrumentation servo systems, tracking mounts, high power inverters, etc.

I claim:

1. A bipolar servo motor amplifier commutation circuit comprising:
    a main direct current potential source having a positive and a negative terminal;
    a bridge network of motor silicon controlled rectifiers forming two legs with said servo motor connected between said legs, said motor silicon controlled rectifiers having anodes connected to said positive terminal and said cathodes connected to said negative terminal;
    a clockwise commutation circuit;
    a counterclockwise commutation circuit, each of said commutation circuits comprising an isolated power supply in series with a commutation capacitor and a charging silicon controlled rectifier, said isolated power supply having a positive terminal connected to the anode of said charging silicon controlled rectifier and having a negative terminal connected to a junction between said commutation capacitor and said servo motor;
    a clockwise commutation silicon controlled rectifier;
    a counterclockwise commutation silicon controlled rectifier, each of said commutation silicon controlled rectifiers connected to its respective commutation circuit by having its anode connected to a junction between the cathode of said charging silicon controlled rectifier and said commutation capacitor and having its cathode connected to said negative terminal; and
    a logic control circuit having a plurality of outputs therefrom that are applied as input signals to the switching circuits of said charging, commutation, and motor silicon controlled rectifiers and motor damping is achieved.

2. A commutation circuit as set forth in claim 1 wherein said isolated power supply is one hundred direct current volts.

3. A commutation circuit as set forth in claim 2 wherein the values of said commutation capacitor and said charging silicon control rectifier are such that the commutation capacitor is fully charged by said isolated power supply within fifty seconds.

* * * * *